United States Patent
Nguyen et al.

(10) Patent No.: US 11,741,488 B1
(45) Date of Patent: Aug. 29, 2023

(54) SYSTEM AND METHOD FOR ON-DEVICE USER-CENTRIC DIGITAL MARKETING AND PRINTING

(71) Applicant: Toshiba TEC Kabushiki Kaisha, Shinagawa-ku (JP)

(72) Inventors: Christopher Nguyen, Huntington Beach, CA (US); Louis Ormond, Irvine, CA (US); Marianne Kodimer, Huntington Beach, CA (US); Methee Phoboonme, Rancho Santa Margarita, CA (US); Jeffrey Wong, Aliso Viejo, CA (US)

(73) Assignee: Toshiba TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/940,806

(22) Filed: Sep. 8, 2022

(51) Int. Cl.
  *G06Q 30/0207* (2023.01)
  *G06F 3/12* (2006.01)
  *G06Q 30/0273* (2023.01)

(52) U.S. Cl.
  CPC ....... *G06Q 30/0207* (2013.01); *G06F 3/1203* (2013.01); *G06F 3/1238* (2013.01); *G06F 3/1256* (2013.01); *G06F 3/1267* (2013.01); *G06F 3/1272* (2013.01); *G06F 3/1288* (2013.01); *G06Q 30/0273* (2013.01); *G06F 3/1204* (2013.01)

(58) Field of Classification Search
  CPC ............ G06Q 30/0207; G06Q 30/0273; G06F 3/1203; G06F 3/1238; G06F 3/1256; G06F 3/1267; G06F 3/1272; G06F 3/1288; G06F 3/1204
  USPC ........................................................ 358/1.15
  See application file for complete search history.

(56) References Cited

U.S. PATENT DOCUMENTS

| | | | |
|---|---|---|---|
| 2011/0078171 A1* | 3/2011 | Wagenblatt | G06F 16/907 715/810 |
| 2014/0278815 A1* | 9/2014 | Grant | G06Q 30/0201 705/7.36 |

* cited by examiner

*Primary Examiner* — Darryl V Dottin
(74) *Attorney, Agent, or Firm* — Ulmer & Berne LLP; John X. Garred

(57) ABSTRACT

A system and method directs promotional information, such as coupons of possible interest to a user, when they release their cloud-stored print job from a multifunction peripheral at their selected location. The user is identified, along with their location, and promotional information of possible relevance to the user is displayed on the multifunction peripheral touchscreen. Information selected by the user will be printed out along with their released print job. Businesses register and store their promotional information with the cloud print server, and may be assessed a fee when their literature is printed.

20 Claims, 7 Drawing Sheets

SYSTEM AND METHOD FOR ON-DEVICE USER-CENTRIC DIGITAL MARKETING AND PRINTING

TECHNICAL FIELD OF THE INVENTION

This application relates generally to printing. The application relates more particularly to printing of user-centric recommend promotions displayed for selectable printing in conjunction with a user's release of a print job from the cloud to a multifunction peripheral.

BACKGROUND OF THE INVENTION

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

Cloud based printing systems allow users to send their print job to a cloud server. They can release and print their print job at any multifunction peripheral commonly registered with a user. Users can walk up to a multifunction peripheral at a time and location of their choosing to obtain their printout.

BRIEF DESCRIPTION OF THE DRAWINGS

Various embodiments will become better understood with regard to the following description, appended claims and accompanying drawings wherein:

DETAILED DESCRIPTION OF THE INVENTION

Figure 1:
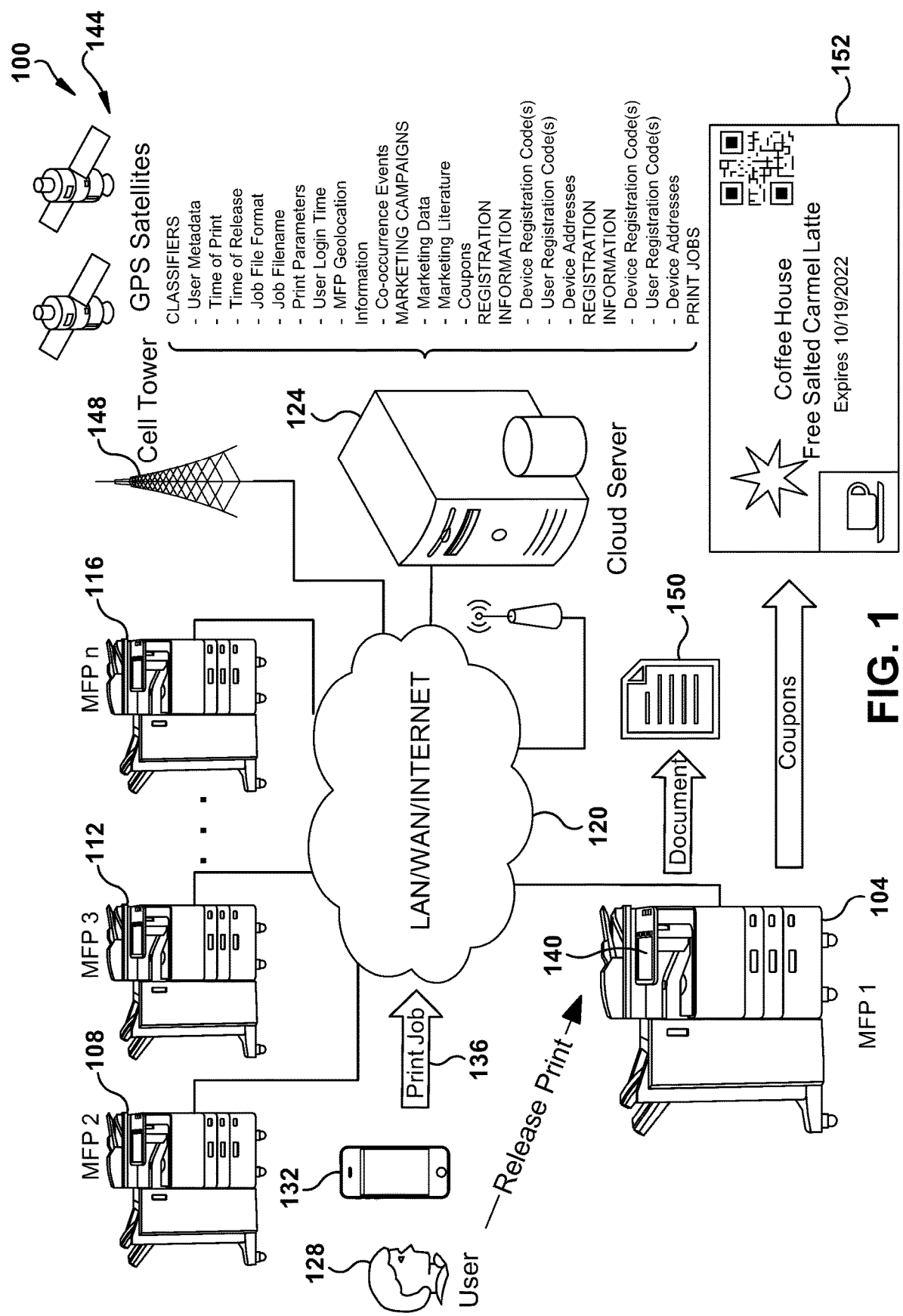
FIG. 1 an example embodiment of a system for on-device, user-centric digital marketing and printing.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

To drive sales opportunities, businesses can market themselves by using direct marketing methods such as emails, text messages, phone calls, etc. Targeting specific audiences is a strategy to help customer engagement and thus create new sales opportunities. There may be pitfalls with direct marketing campaigns. Direct marketing may be considered junk when a target audience loses interest, or has no interest, such as when emails are deleted immediately or moved to a junk folder to which additional emails will be automatically sent. Some target audiences may feel that the direct marketing is intrusive which creates a negative experience. Effective direct marketing can require significant time and effort to create promotional content that is meaningful, consistent and uncluttered.

Example embodiments herein include a cloud platform that combines secure print release capabilities with a digital marketing application to offer user-centric, recommended promotions that are locally accessible to MFP users. A secure print release application allows users of the cloud platform to submit print jobs to the cloud using compatible print drivers. Print jobs are stored on the cloud platform, which can then be released by the users at any of the registered MFPs to which a user has access. Users are not confined to a location or building to release the jobs as long as the MFPs are registered to their cloud platform.

Example embodiments provide a cooperative digital marketing system wherein local businesses can participate in shared marketing campaigns with businesses that are using MFPs. They can promote marketing data that may include offering coupons, online shopping codes, referral programs, subscriptions, etc, to MFP users when they perform a print releases. Advertising businesses may pay for the printing costs of the promotions as well as a campaign fee to businesses hosting an MFP. By doing so, both businesses create a value stream to increase revenue.

In further example embodiments, a cloud platform has an artificial intelligence ("AI") module that profiles print jobs and builds various classifiers, such as the user's metadata, time of print, time of release, job file format, job filename, other print parameters, geolocation of the registered MFPs, and historical printing usage. MFP locations may be pre-set, or determined from positioning such as via GPS, cell towers, wireless networks, IP addresses, or the like. The AI module uses the profiles to create user-centric recommendations of promotional offerings that are locally based and readily available to users. At the time of print release, the cloud platform pushes relevant promotional information to users' MFPs. Promotions are displayed to the user on the MFP user interface, such as its touchscreen panel. If a user chooses to print their promotions, then the additional print usage is tracked and fed back to the AI module for continued refinements in the recommendations for other users by using co-occurrence.

An example of an AI recommended promotion is detecting the user's login time and the selected job which has been profiled as "food." The AI can push a promotion for a special offer coupon of 1 Large Pizza at local pizzeria to the user. If the user prints the promotion, then the AI will use the co-occurrence and promote to other users doing print release within the same time frame without needing to use the specific print profile.

Example embodiments herein to allow local businesses to create direct marketing campaigns, promote local businesses and allow businesses hosting MFPs to receive advertising revenue at no cost to them. An AI module can recommend user-centric promotions of local businesses to users at time of print release and utilize real-time co-occurrences to offer promotions other users with a common geolocation area. Cooperative digital marketing campaigns to increased revenues.

Example embodiments herein overcome direct marketing pitfalls with user of a cloud platform that uses an AI recommendation engine to provide user-centric recommendations of other local businesses that are hosting Toshiba MFPs. When a user selects a secure cloud print job for release on an MFP, AI detects the print job profile and pushes relevant promotions to the user. If the user prints the promotions, then the AI uses that co-occurrence to offer the same promotions to other users logging to other MFPs of the same relative geolocation. The cloud platform provides a method for a business with MFPs to generate a revenue stream without any added costs while helping to promote local businesses.

FIG. 1 illustrates an example embodiment of a system 100 for on-device, user-centric digital marketing and printing. The system includes one or more MFPs, such as MFP 104, MFP 108, MFP 112 and MFP 116. MFPs are in data communication via network cloud 120, cloud, suitably comprised of a local area network (LAN), a wide area network (WAN), which may comprise the Internet, or any suitable combination thereof. Network cloud 120 is comprised of any suitable wireless or wired data connection or combination thereof. Also in data communication with network cloud 120 is cloud server 124, suitably comprising a print server to receive and release user print jobs at one or more commonly registered MFPs to commonly registered users.

Cloud server 124 stores classifiers, such as user metadata, time of print, time of release, job file format, job filename, print parameters, user login information, such as login time, MFP geolocation information and co-occurrence events. Cloud server 124 also stores marketing campaigns associated with businesses who sign up to market to users. Marketing campaigns may include marketing data, which may comprise printable files for marketing literature or coupon information. Cloud server 124 further stores registration information, such as device registration codes, user registration codes and device addresses, such as IP addresses associated with each MFP. Cloud server 124 further stores print jobs submitted by users for subsequent release at their selected MFP.

In the illustrated example embodiment of FIG. 1, user 128 sends uses their digital device 132, such as smartphone or tablet, to send print job 136 to cloud server 124. User 128 selects an MFP to receive a printout. User 128 selects MFP 104, and logs in, such as by touchscreen 140, and issues a print command. In response, the document is sent from cloud server 124 to MFP 104 from which a tangible printout 150 is made. A location of MFP 104 may be determined via any suitable means, such as via GPS satellites 144, or via cell sector information from cell tower 148. One or more classifiers associated with the printout are subject to application of any suitable artificial intelligence or machine learning system (AI/ML), such as Microsoft AZURE. Application of AI/ML facilitates selection of one or more marketing campaigns and their associated marketing data. In the example, information such as user location and time of day, leads to a subset of marketing data of possible relevance to user 128. This may lead to one or more coupons of possible interest which are suitably indicated to the user on touchscreen 140. In the example, user 128 selects a coffee coupon option, which selection leads to a printout of coupon 152 contemporaneously with printout of tangible printout 150. Data associated with coupons selected for printing is fed back to cloud server 124, providing analytical information to be used in conjunction with subsequent print jobs.

Figure 2:
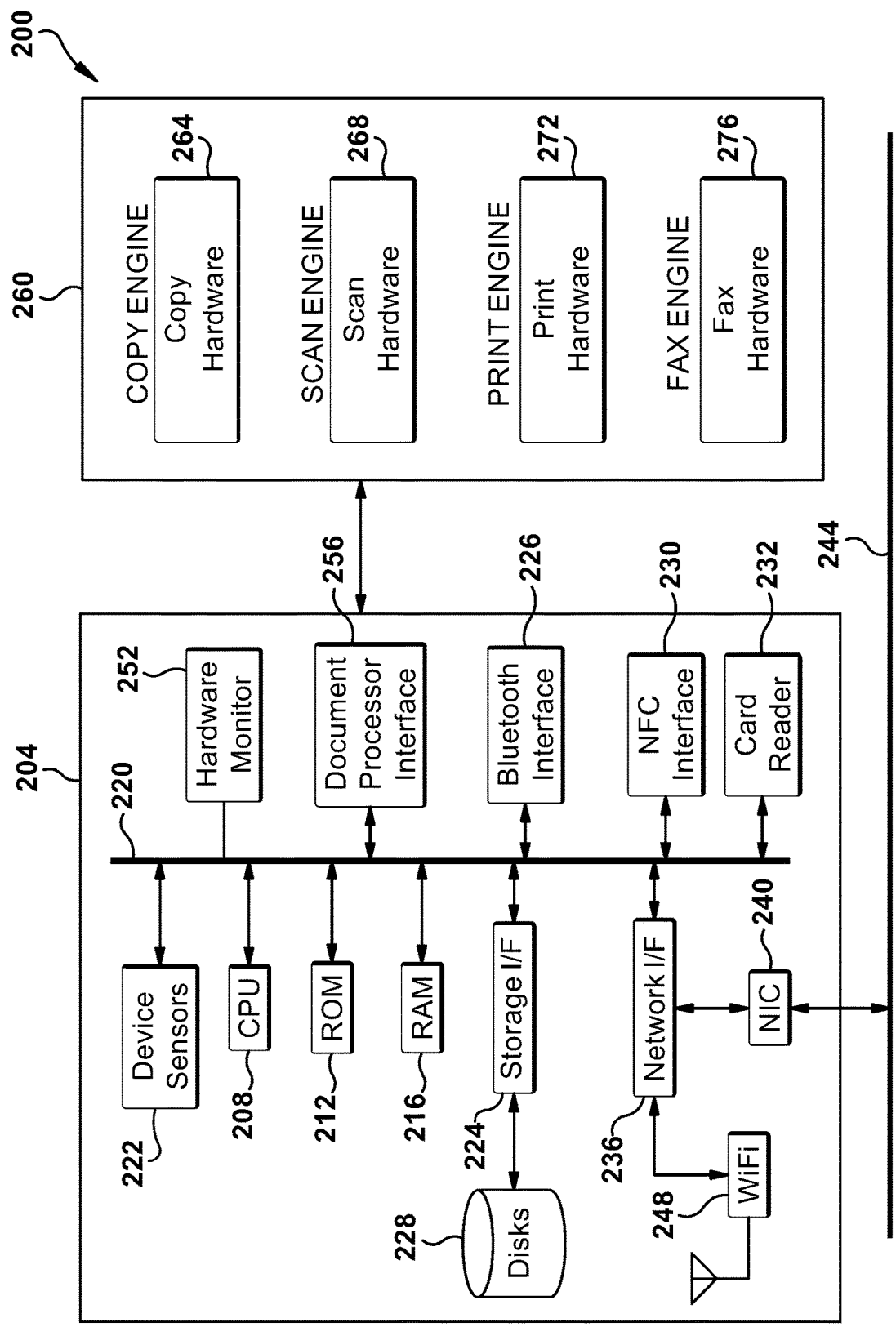
FIG. 2 is an example embodiment of a networked digital device, such as multifunction peripheral.

Turning now to FIG. 2, illustrated is an example embodiment of a networked digital device comprised of document rendering system 200 suitably comprised within an MFP, such as with MFPs 104, 108, 112 and 116 of FIG. 1. It will be appreciated that an MFP includes an intelligent controller 204 which is itself a computer system. Thus, an MFP can itself function as a server with the capabilities described herein. Included in intelligent controller 204 are one or more processors, such as that illustrated by processor (CPU) 208. Each processor is suitably associated with non-volatile memory, such as read-only memory (ROM) 212, and random access memory (RAM) 216, via a data bus 220.

Processor 208 is also in data communication with a storage interface 224 for reading or writing to a storage 228, suitably comprised of a hard disk, optical disk, solid-state disk, cloud-based storage, or any other suitable data storage as will be appreciated by one of ordinary skill in the art.

Processor 208 is also in data communication with additional interfaces, such as Bluetooth interface 226, NFC interface 230 and card reader 232 for data exchange with proximity cards, such as card keys.

Processor 208 is also in data communication with a network interface 236 which provides an interface to a network interface controller (NIC) 240, which in turn provides a data path to any suitable wired interface or physical network connection 244, or to a wireless data connection via wireless network interface 248. Example wireless network interfaces include optical, cellular, Wi-Fi, wireless universal serial bus (wireless USB), satellite, and the like. Example wired interfaces include Ethernet, USB, IEEE 1394 (FireWire), Lightning, telephone line, or the like.

Processor 208 can also be in data communication with any suitable user input/output (I/O) network interface 222 which provides data communication for interfacing with user peripherals, such as displays, keyboards, mice, track balls, touch screens, or the like. While touchscreens are discussed in example embodiments herein, it is to be appreciated that any suitable user interface, such as keyboards, switches, displays, trackballs or mice may be used. Processor 208 can also be in communication with hardware monitor 252, such as a page counter, temperature sensor, toner or ink level sensor, paper level sensor, or the like.

Also in data communication with data bus 220 is a document processor interface 256 suitable for data communication with the document rendering system 260, including MFP functional units. In the illustrated example, these units include a copy engine comprising copy hardware 264, a scan engine comprise of scan hardware 268, a print engine comprised of print hardware 272 and a fax engine comprised of fax hardware 276 which together comprise document rendering system 260. It will be understood that functional units are suitably comprised of intelligent units, including any suitable hardware or software platform.

Figure 3:
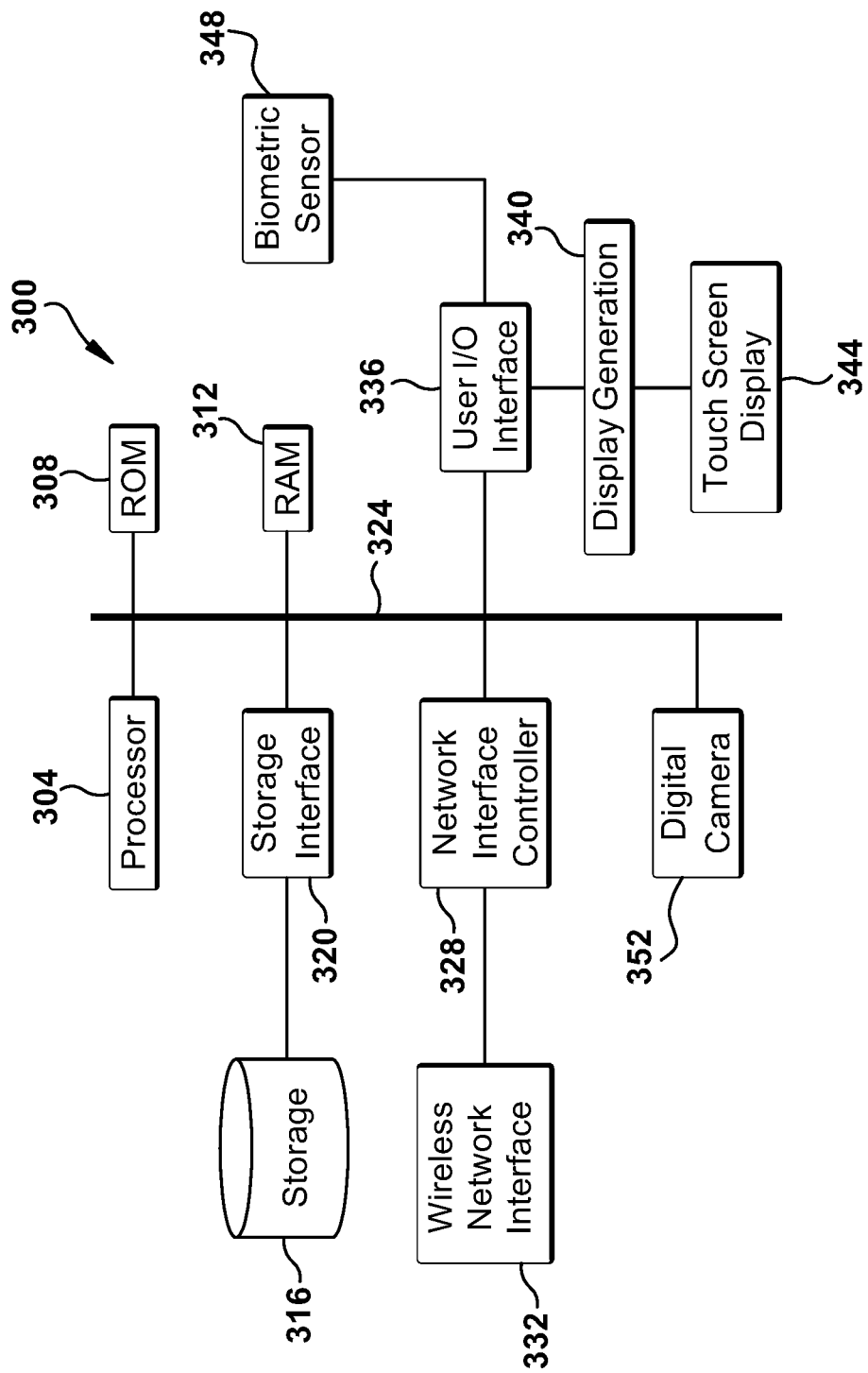
FIG. 3 is an example embodiment of a digital device system.

Turning now to FIG. 3, illustrated is an example embodiment of a digital data processing device 300 such as cloud server 124 or digital device 132 of FIG. 1. It is to be appreciated that some components listed may be unnecessary in certain configurations. Components of the digital data processing device 300 suitably include one or more processors, illustrated by processor 304, memory, suitably comprised of read-only memory 308 and random access memory 312, and bulk or other non-volatile storage 316, suitably connected via a storage interface 320. Data communication among components is accomplished via data bus 324. A network interface controller 328 suitably provides a gateway for data communication with other devices, via any wireless or wired connection, such as via wireless network interface 332. A user input/output interface 336 is suitably comprised of display generator 340 interfacing with touchscreen display 344. As noted above, any suitable user input and display can be used. User input/output interface 336 also provides connection to biometric sensor 348, suitably comprised of a fingerprint sensor, retinal sensor, or the like, and may be used to secure device access to one or more users. Processor 304 processor is also in data communication with a digital camera 352, suitably used to capture images which may include encoded images such as barcodes or QR codes. Digital camera 352 is also suitably used for facial recognition, including facial recognition for securing device access.

Figure 4:
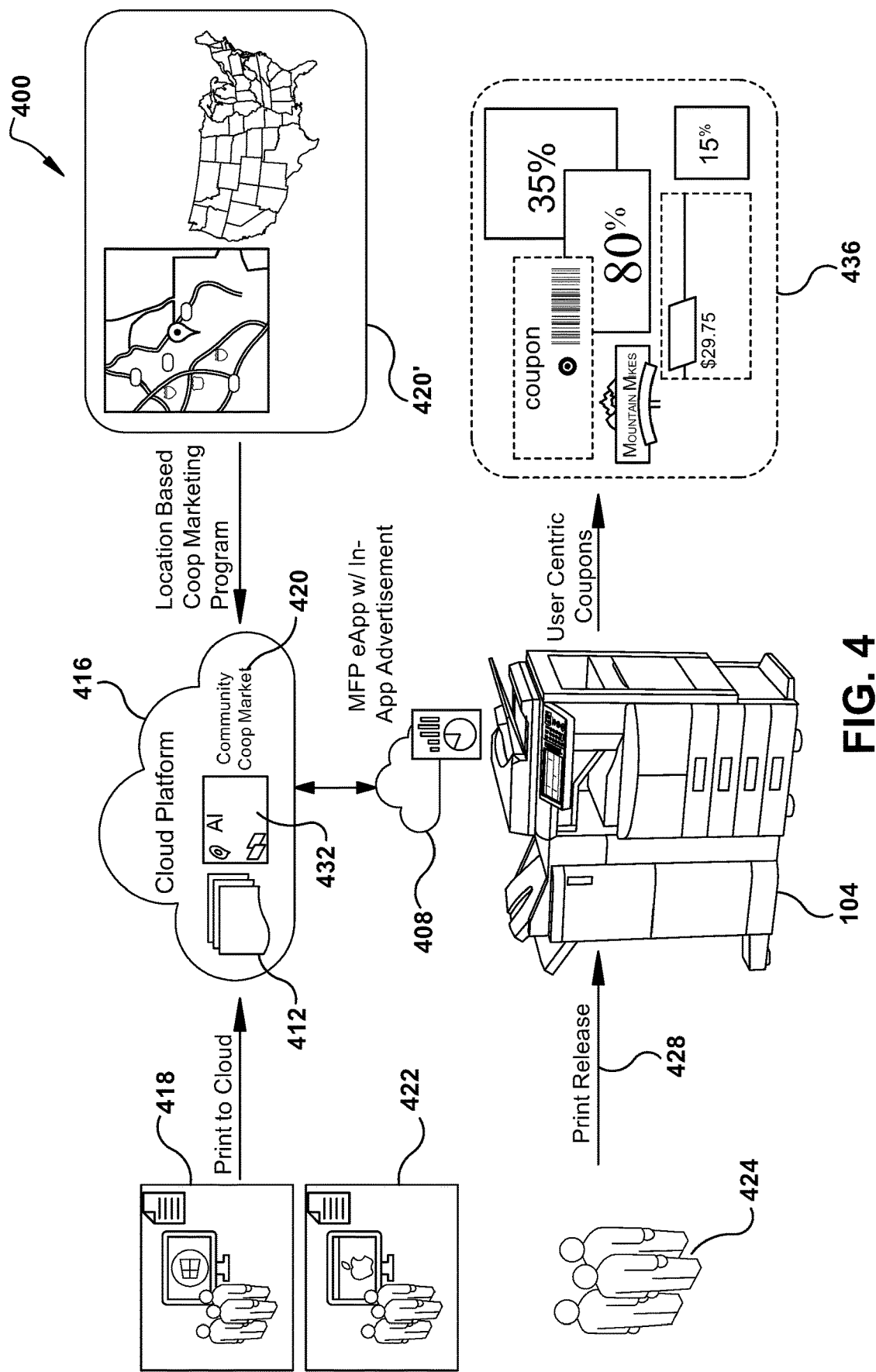
FIG. 4 is an example embodiment of a system overview for on-device user-centric digital marketing and printing.

FIG. 4 illustrates an example embodiment of a system overview 400 for on-device user-centric digital marketing and printing. MFP 104 is enabled via eApp 408 to integrate advertisements with print jobs 412 released from cloud platform 416. Cloud platform 416 houses marketing campaign information, such as campaign 420, expanded at 420', associated with Community Group Market. Print jobs 412 are obtained by users, such as users 418 and users 422. One or more users 424 issue print release command 428 to generate a printout of their associated print jobs from cloud platform 416. Application of AI/ML to associated classifiers result in a printout of advertising information 436.

Figure 5:
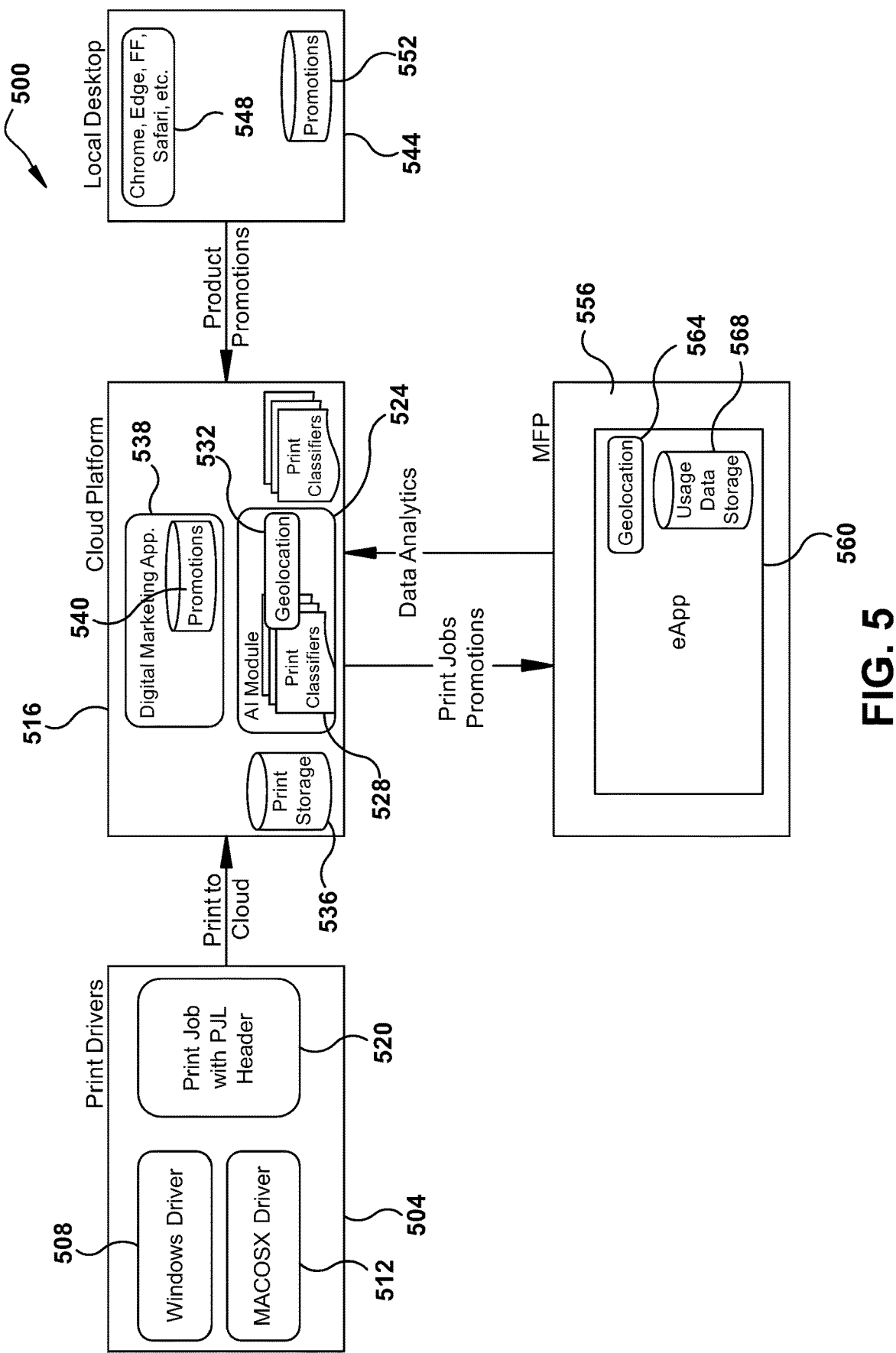
FIG. 5 is an example embodiment of a software block diagram for on-device user-centric digital marketing and printing.

FIG. 5 illustrates an example embodiment of a software block diagram 500 for on-device user-centric digital marketing and printing. Print driver module 504 includes print drivers, such as Windows driver 508 and MACOSX driver 512 to print to cloud platform module 516 with a suitable print job language header 520. Cloud platform module 516 includes AI module that includes print classifiers 528 and geolocation information 532. Incoming print jobs are housed in print storage 536. Digital marketing application 538 includes promotional information 540, suitably supplied by local desktop module 544. Desktop module 544 is suitably provided by web interface 548 to receive promotions 552. MFP module 556 includes eApp 560 that comprises geolocation information 564 and provides usage data storage 568. Usage storage data is suitably relayed to cloud platform module 516 for co-occurrence events data analytics.

Figure 6:
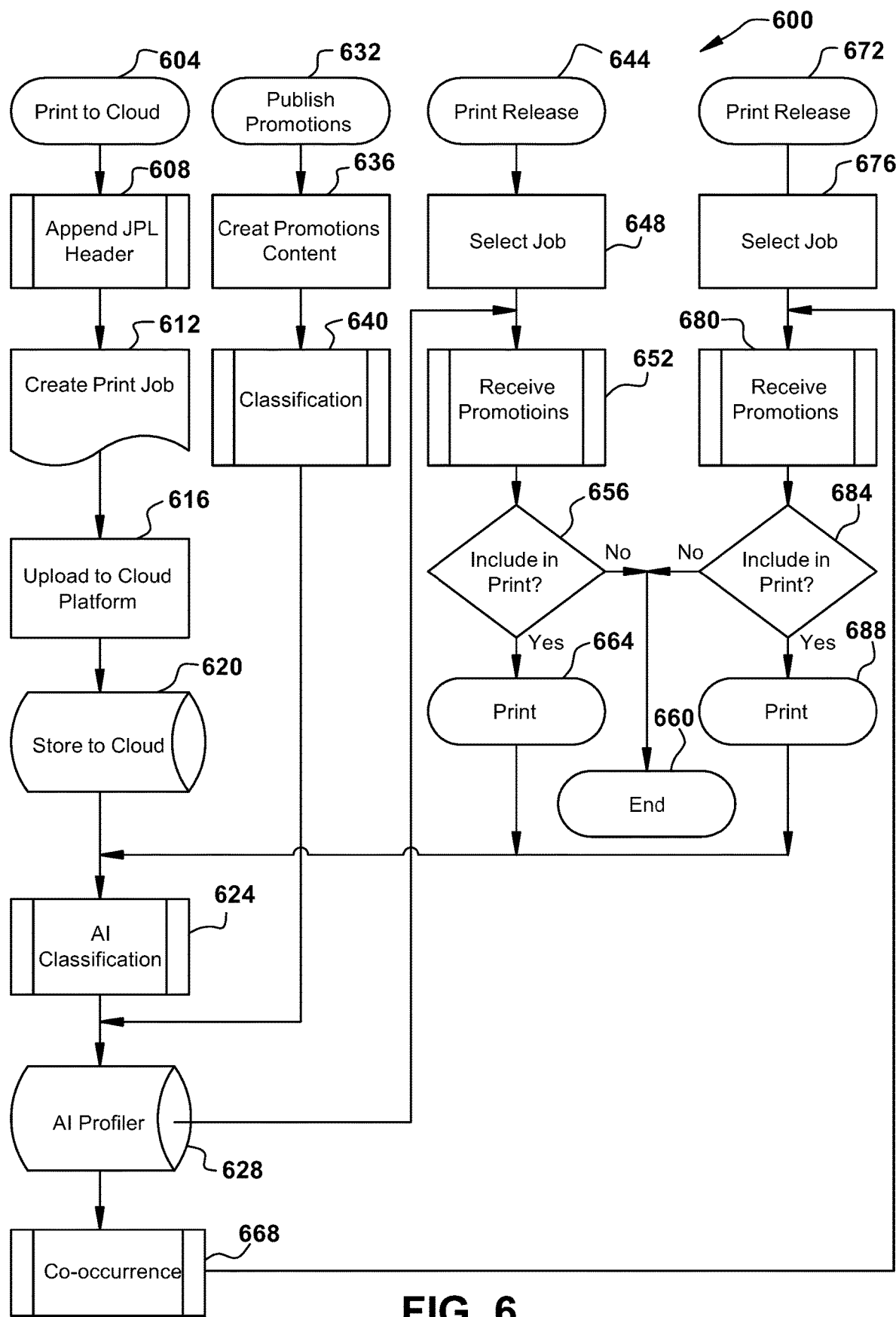
FIG. 6 is an example embodiment of a flowchart for a system for on-device user-centric digital marketing and printing.

FIG. 6 illustrates an example embodiment of a flowchart 600 for a system for on-device user-centric digital marketing and printing. A first aspect of flowchart 600 commences with a print to cloud operation 604. A JPL header is appended to an associated print job at block 608 and a print job is created at block 612. The print job and JPL header are uploaded to a cloud platform at block 616 where it is stored at block 620. The print job and JPL are then classified at block 624 and sent to AI profiler 628.

A second aspect of flowchart 600 is associated with creation and entry of advertisement campaigns, which is commenced with an operation to publish promotions at block 632, and promotions are created at block 636. Promotions are classified at block 640 sent to AI profiler 628.

A third aspect of flowchart 600 commences at block 644 when a user selects a print release and then selects a job for release at block 648. Relevant promotions are then received from AI profiler 628 at block 652. A user selects whether to print one or more promotions at block 656. If none are selected, only the user's print job will be printed and the process ends at block 660. If a user decides to print promotional material at block 656, a printout is rendered at block 664, and information as to what material was printed, and this information is fed to AI classification at block 624 for future use and/or it is sent to AI profiler 628. AI profiler 628 generates co-occurrence event 668 from this information.

A fourth aspect of flowchart 600 commences with a second print release at block 672. An associated user selects a print job at block 676 and promotions including co-occurrence event promotions from block 668 are received into block 680. If the user decides to print one or more coupons at block 684, they are printed in block 688, and this information is fed to AI classification at block 624 for future use.

Figure 7:
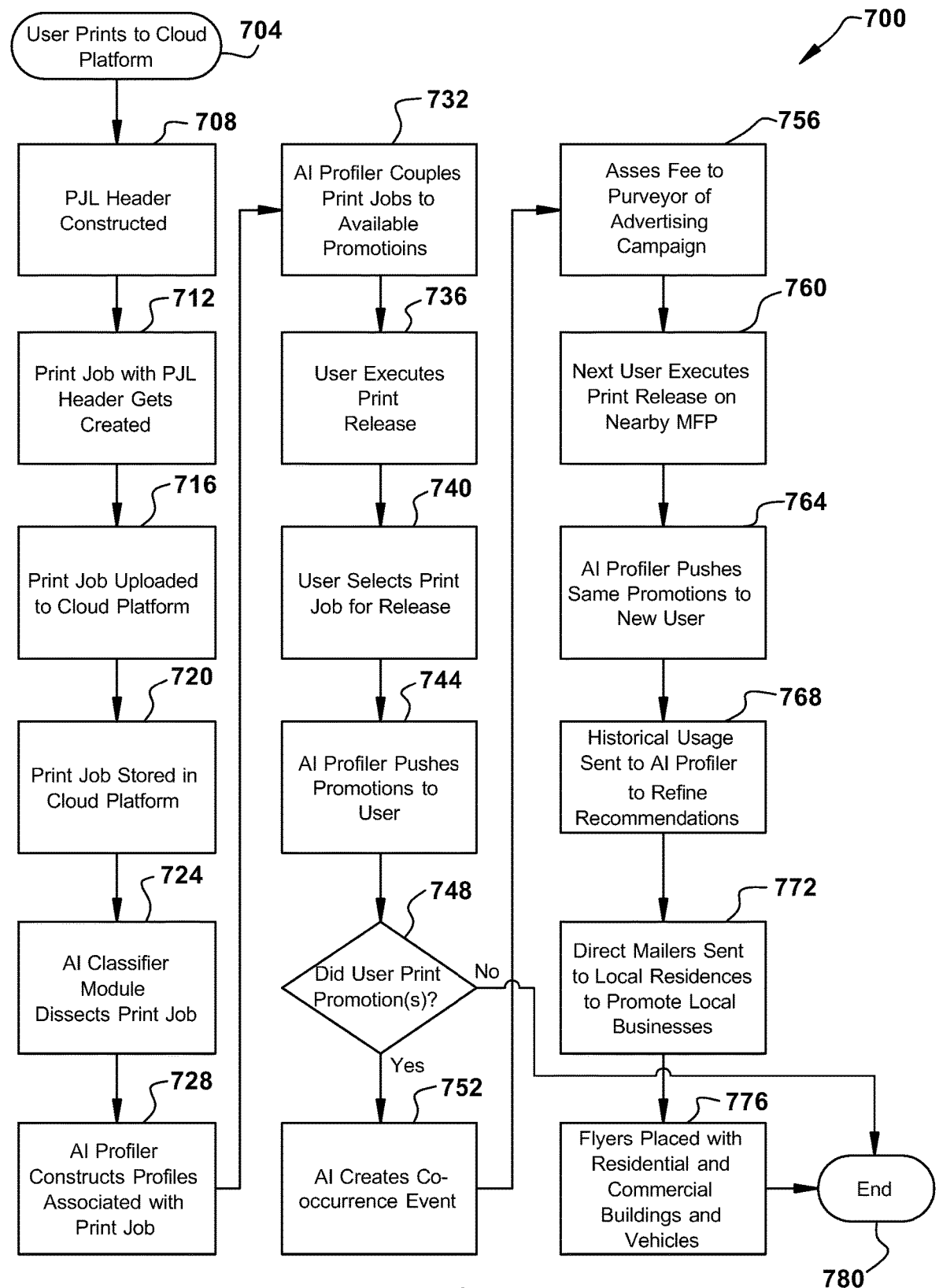
FIG. 7 is an example embodiment of a use case of a system for on-device user-centric digital marketing and printing.

FIG. 7 illustrates an example embodiment of a flowchart 700 for a use case of a system for on-device user-centric digital marketing and printing. The system commences at block 704 when a user prints to a cloud platform. A PJL header is constructed at block 708 and a print job with a PJL header is created at block 712. The print job is uploaded to a cloud platform at block 716 where it is stored at block 720. An AI classifier dissects the print job at block 724 and an AI profiler constructs profiles associated with the print job at block 728. The AI profiler couples print jobs to available promotions at block 732. Next, a user executes a print release at block 736 and selects one or more print jobs for release at block 740. The AI profiler then pushes determined promotions to the user at block 744. If the user decides to print one or more promotions at block 748, a co-occurrence event is created at block 752. A fee may be assessed to a purveyor associated with printed promotions at block 756.

A next user executes their print release at block 760, and the AI profiler pushes the same promotions to the new user at block 764. Historical usage information is sent to the AI profiler at block 768 to refine recommendations. Next, determined direct mailers are sent to local residences at block 772 and flyers are place with residential and commercial buildings and on vehicles at block 776. The process ends at 780.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:
   one or more processors;
   memory storing marketing data associated with marketing campaigns for each of a plurality of businesses;
   a print engine;
   a user interface including a user input and a display;
   a network interface;
   the user interface configured to receive login information to identify an associated user;
   the one or more processors configured to retrieve, into the memory, a print job associated with an identified user from an associated cloud server via the network interface;
   the one or more processors further configured to determine a subset of the marketing campaigns in accordance with the identified user;
   the one or more processors further configured to show promotional information corresponding to each marketing campaign in the subset on the display;

the one or more processors further configured to generate a printout of the print job via the print engine in accordance with a release by the user received via the user interface;

the one or more processors further configure to receive a selection by the user of all or some of the promotional information shown on the display; and the one or more processors further configured to generate a printout of marketing literature in accordance with promotional information selected by the user.

2. The system of claim 1 wherein the one or more processors are further configured to determine the subset of the marketing campaigns in accordance with a geolocation of the print engine.

3. The system of claim 2 wherein the one or more processors are further configured to determine the subset of the marketing campaigns in accordance with a time, day or date associated with a login of the user or a time, day or date associated with the printout of the print job.

4. The system of claim 3 wherein the one or more processors are further configured to determine the subset of the marketing campaigns in accordance with one or more classifiers comprised of: user metadata; a file format associated with the print job; a filename associated with the print job; content of the print job or print parameters associated with the print job.

5. The system of claim 3 wherein the one or more processors are further configured to determine the subset of the marketing campaigns in accordance with prior printouts of marketing literature selected by the user.

6. The system of claim 2 wherein the one or more processors are further configured to generate a fee assessment to each business associated with a printout of marketing literature.

7. The system of claim 6 wherein the marketing literature includes a coupon.

8. A method comprising:

storing, in a memory, marketing data associated with marketing campaigns for each of a plurality of businesses;

receiving login information to identify an associated user;

retrieving, into the memory, a print job associated with an identified user from an associated cloud server via a network interface;

determining, via one or more processors, a subset of the marketing campaigns in accordance with the identified user;

showing promotional information corresponding to each marketing campaign in the subset on a display;

generating a printout of the print job, via a print engine, in accordance with a release by the user received via the user interface;

receiving a selection by the user of all or some of the promotional information shown on the display; and generating a printout of marketing literature in accordance with promotional information selected by the user.

9. The method of claim 8 further comprising determining the subset of the marketing campaigns in accordance with a geolocation of the print engine.

10. The method of claim 9 further comprising determining the subset of the marketing campaigns in accordance with a time, day or date associated with a login of the user or a time, day or date associated with the printout of the print job.

11. The method of claim 10 further comprising determining the subset of the marketing campaigns in accordance with one or more classifiers comprised of: user metadata; a file format associated with the print job; a filename associated with the print job; content of the print job or print parameters associated with the print job.

12. The method of claim 10 further comprising determining the subset of the marketing campaigns in accordance with prior printouts of marketing literature selected by the user.

13. The method of claim 9 further comprising generating a fee assessment to each business associated with a printout of marketing literature.

14. The method of claim 13 wherein the marketing literature includes a coupon.

15. A system comprising:

a one or more processors;

a network interface;

the memory storing a print job from an identified user received via the network interface;

the memory storing marketing data associated with marketing campaigns for each of a plurality of businesses;

the one or more processors configured to receive a print job release request from the identified user at an identified multifunction peripheral via the network interface;

the one or more processors further configured to determine a subset of the marketing campaigns in accordance with classifier data comprising the print job and the identified user; and the one or more processors further configured to send the print job and marketing data corresponding to each of the subset of marketing campaigns to the identified multifunction peripheral.

16. The system of claim 15 wherein the marketing data includes data corresponding to printable coupons, and wherein the one or more processors are further configured to receive, into the memory via the network interface, feedback data from the identified multifunction peripheral indicative as to which of the printable coupons were printed thereon, and update on the classifier data in accordance with received feedback data.

17. The system of claim 16 wherein the classifier data includes location data corresponding to a location of the identified multifunction peripheral.

18. The system of claim 17 wherein the classifier data includes a time, day or date of the print job release request.

19. The system of claim 18 wherein the classifier data includes one or more of user metadata; a file format associated with the print job; a filename associated with the print job; content of the print job or print parameters associated with the print job.

20. The system of claim 19 wherein the processor is further configured to assess a fee to businesses associated with printed coupons.

* * * * *